US011586531B2

(12) United States Patent
Shevach et al.

(10) Patent No.: US 11,586,531 B2
(45) Date of Patent: Feb. 21, 2023

(54) GENERATING TEST INPUT VALUES FOR FUNCTIONAL COMPONENTS BASED ON TEST COVERAGE ANALYSIS

(71) Applicant: Red Hat, Inc., Raleigh, NC (US)

(72) Inventors: Shay Shevach, Raanana (IL); Boaz Shuster, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 148 days.

(21) Appl. No.: 17/037,961

(22) Filed: Sep. 30, 2020

(65) Prior Publication Data

US 2022/0100640 A1 Mar. 31, 2022

(51) Int. Cl.
*G06F 11/36* (2006.01)
*G06N 20/00* (2019.01)
*G06F 8/41* (2018.01)

(52) U.S. Cl.
CPC ............ *G06F 11/3676* (2013.01); *G06F 8/42* (2013.01); *G06F 11/3684* (2013.01); *G06F 11/3688* (2013.01); *G06F 11/3692* (2013.01); *G06N 20/00* (2019.01)

(58) Field of Classification Search
CPC .... G06F 11/3676; G06F 8/42; G06F 11/3684; G06N 20/00
USPC .................................................. 717/124–167
See application file for complete search history.

(56) References Cited

U.S. PATENT DOCUMENTS

| | | | | |
|---|---|---|---|---|
| 8,201,150 B2* | 6/2012 | Ghiloni | ............... | G06F 11/3676 717/124 |
| 8,473,915 B2* | 6/2013 | Brodsky | ............. | G06F 11/3676 717/124 |
| 8,561,024 B2 | 10/2013 | Basler et al. | | |
| 9,477,583 B2 | 10/2016 | Maddela | | |
| 9,710,367 B1 | 7/2017 | Nagineni | | |
| 10,303,458 B2* | 5/2019 | Ouarraoui | ............. | G06F 3/0605 |
| 2013/0117005 A1* | 5/2013 | Farchi | ................ | G06F 11/3676 703/21 |
| 2017/0132121 A1* | 5/2017 | Cooper | ............... | G06F 11/3612 |
| 2020/0019654 A1* | 1/2020 | Gou | .................... | G06F 30/3323 |
| 2020/0371899 A1* | 11/2020 | Ahmed | ............... | G06F 11/3676 |
| 2021/0124610 A1* | 4/2021 | Gardner | ..................... | G06F 8/63 |
| 2021/0124613 A1* | 4/2021 | Goodwin | .............. | G06F 9/5077 |

OTHER PUBLICATIONS

Zhu, Hong, Patrick AV Hall, and John HR May. "Software unit test coverage and adequacy." Acm computing surveys (csur) 29.4 (1997): pp. 366-427. (Year: 1997).*

(Continued)

*Primary Examiner* — Satish Rampuria
(74) *Attorney, Agent, or Firm* — Dority & Manning, P.A.

(57) ABSTRACT

Generating test input values for functional components based on test coverage analysis is disclosed herein. In one example, a processor device of a computing device performs a test coverage analysis of a plurality of programming instructions of a functional component that takes a plurality of input parameters. Based on the test coverage analysis, the processor device identifies a subset of the programming instructions for which testing has not been performed. The processor device then identifies a data type for each of the functional component's input parameters, and generates test input values based on the data types and the test coverage analysis, including a test input value that causes executable instructions corresponding to the subset of programming instructions to be executed during subsequent testing. The test input values may be used during subsequent unit testing to ensure full test coverage of the functional component.

16 Claims, 9 Drawing Sheets

(56) References Cited

OTHER PUBLICATIONS

Ostrand, Thomas J., and Marc J. Balcer. "The category-partition method for specifying and generating fuctional tests." Communications of the ACM 31.6 (1988): pp. 676-686. (Year: 1988).*

Ricca, Filippo, and Paolo Tonella. "Analysis and testing of web applications." Proceedings of the 23rd International Conference on Software Engineering. ICSE 2001. IEEE, 2001.pp. 25-34 (Year: 2001).*

Almasi, M. Moein, et al. "An industrial evaluation of unit test generation: Finding real faults in a financial application." 2017 IEEE/ACM 39th International Conference on Software Engineering: Software Engineering in Practice Track (ICSE-SEIP). IEEE, 2017.pp. 263-272 (Year: 2017).*

Andrews, James H., et al. "Using mutation analysis for assessing and comparing testing coverage criteria." IEEE Transactions on Software Engineering 32.8 (2006): pp. 608-624. (Year: 2006).*

Adrion, W. Richards, Martha A. Branstad, and John C. Cherniavsky. "Validation, verification, and testing of computer software." ACM Computing Surveys (CSUR) 14.2 (1982): 159-192. (Year: 1982).*

Author Uknown, "30 Days of React," Available online at https://www.newline.co/fullstack-react/assets/media/sGEMe/MNzue/30-days-of-react-ebook-fullstackio.pdf, accessed online Sep. 28, 2020, pp. 1-303.

Author Uknown, "Jest-Preset-Angular," Available online at https://github.com/thymikee/jest-preset-angular, accessed online Jun. 29, 2020, 14 pages.

Krasnov, Michael, "Advanced Testing in React Native with Jest: Components," Available online at https://everyday.codes/react-native/advanced-testing-in-react-native-with-jest-components, Dec. 30, 2019, 5 pages.

Author Uknown, "Snapshot Testing," Facebook Inc., Available online at https://jestjs.io/docs/en/snapshot-testing, accessed online Jun. 29, 2020, 12 pages.

Author Uknown, "Testing Redux," High School Technology Services, Available online at https://myhsts.org/docs/react_js/10.pdf, accessed online Sep. 28, 2020, 21 pages.

* cited by examiner

IDENTIFY A DATA TYPE OF EACH INPUT PARAMETER OF THE PLURALITY OF INPUT PARAMETERS
60

BUILD A TREE DATA STRUCTURE COMPRISING A PLURALITY OF NODES CORRESPONDING TO THE PLURALITY OF INPUT PARAMETERS, WHEREIN EACH INNER NODE AMONG THE PLURALITY OF NODES CORRESPONDS TO A COMPOSITE DATA TYPE, AND EACH LEAF NODE AMONG THE PLURALITY OF NODES CORRESPONDS TO A PRIMITIVE DATA TYPE
62

GENERATE A PLURALITY OF TEST INPUT VALUES BASED ON THE DATA TYPE OF EACH INPUT PARAMETER OF THE PLURALITY OF INPUT PARAMETERS AND THE TEST COVERAGE ANALYSIS, WHEREIN A TEST INPUT VALUE AMONG THE PLURALITY OF TEST INPUT VALUES CAUSES EXECUTABLE INSTRUCTIONS CORRESPONDING TO THE SUBSET OF PLURALITY OF PROGRAMMING INSTRUCTIONS TO BE EXECUTED DURING SUBSEQUENT TESTING
64

GENERATE A TEST INPUT VALUE FOR EACH LEAF NODE AMONG THE PLURALITY OF NODES OF THE TREE DATA STRUCTURE
66

GENERATE THE PLURALITY OF TEST INPUT VALUES FURTHER BASED ON THE AST REPRESENTATION
68

GENERATING TEST INPUT VALUES FOR FUNCTIONAL COMPONENTS BASED ON TEST COVERAGE ANALYSIS

BACKGROUND

"Unit testing" refers to an approach to software testing in which executable instructions that correspond to an individual unit of programming instructions, referred to herein as a "functional component," are tested to verify that the functional component satisfies design requirements and functions as intended. Unit testing of a functional component that takes input parameters requires that test input values for the functional component be generated, along with corresponding definitions of expected outputs against which the output of unit testing can be compared.

SUMMARY

The examples disclosed herein relate to generating test input values for functional components based on test coverage analysis. In one example, a processor device of a computing device performs a test coverage analysis of a plurality of programming instructions of a functional component that takes a plurality of input parameters. As used herein, "test coverage analysis" refers to a process for analyzing a functional component to identify any portions of the programming instructions thereof for which sufficient unit testing and validation has not been performed. The programming instructions may comprise, e.g., source code, bytecode, or interpreted code, as non-limiting examples. Based on the test coverage analysis, the processor device identifies a subset of the programming instructions for which testing has not been performed (i.e., no test coverage exists for that subset of the programming instructions). The processor device then identifies a data type for each of the functional component's input parameters and generates test input values based on the data types and the test coverage analysis. In particular, the test input values that are generated include a test input value that causes executable instructions corresponding to the subset of programming instructions to be executed during subsequent testing. The test input values may be used during subsequent unit testing to ensure full test coverage of the programming instructions of the functional component.

In some examples, the processor device may first verify that the functional component is a "pure" function (i.e., the functional component depends only on its own input parameters, does not change variables out of its scope, and does not produce side effects). By doing so, the processor device can ensure that the generation of the test input values can be performed automatically, without requiring manual user input. Some examples may provide that identifying the subset of the programming instructions for which testing has not been performed may be accomplished by building an Abstract Syntax Tree (AST) representation of the functional component and using the AST representation to identify the subset. In some examples, identifying the data types of the functional component's input parameters may be accomplished by building a tree data structure comprising a plurality of nodes, where each inner node corresponds to a composite data type and each leaf node corresponds to a primitive data type. The tree data structure may then be traversed to generate test input values for each identified primitive data type corresponding to the leaf nodes.

In another example, a method is provided. The method comprises performing, by a processor device of a computing device, a test coverage analysis of a plurality of programming instructions of a functional component, the functional component comprising a plurality of input parameters. The method further comprises identifying, based on the test coverage analysis, a subset of the plurality of programming instructions for which testing has not been performed. The method also comprises identifying a data type of each input parameter of the plurality of input parameters. The method additionally comprises generating a plurality of test input values based on the data type of each input parameter of the plurality of input parameters and the test coverage analysis, wherein a test input value among the plurality of test input values causes executable instructions corresponding to the subset of the plurality of programming instructions to be executed during subsequent testing.

In another example, a computing device is provided. The computing device comprises a system memory and a processor device coupled to the memory. The processor device is to perform a test coverage analysis of a plurality of programming instructions of a functional component, the functional component comprising a plurality of input parameters. The processor device is further to identify, based on the test coverage analysis, a subset of the plurality of programming instructions for which testing has not been performed. The processor device is also to identify a data type of each input parameter of the plurality of input parameters. The processor device is additionally to generate a plurality of test input values based on the data type of each input parameter of the plurality of input parameters and the test coverage analysis, wherein a test input value among the plurality of test input values causes executable instructions corresponding to the subset of the plurality of programming instructions to be executed during subsequent testing.

In another example, a computer program product is provided. The computer program product is stored on a non-transitory computer-readable storage medium, and includes computer-executable instructions to cause a processor device to perform a test coverage analysis of a plurality of programming instructions of a functional component, the functional component comprising a plurality of input parameters. The computer-executable instructions further cause the processor device to identify, based on the test coverage analysis, a subset of the plurality of programming instructions for which testing has not been performed. The computer-executable instructions also cause the processor device to identify a data type of each input parameter of the plurality of input parameters. The computer-executable instructions additionally cause the processor device to generate a plurality of test input values based on the data type of each input parameter of the plurality of input parameters and the test coverage analysis, wherein a test input value among the plurality of test input values causes executable instructions corresponding to the subset of the plurality of programming instructions to be executed during subsequent testing.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As noted above, "unit testing" refers to an approach to software testing in which executable instructions that correspond to an individual unit of programming instructions, referred to herein as a "functional component," are tested to verify that the functional component satisfies design requirements and functions as intended. The programming instructions that make up a functional component may be source code instructions, an intermediate form of instructions between source code and machine-executable instructions (e.g., bytecode or portable code), or interpreted code, as non-limiting examples. Unit testing of a functional component that takes input parameters requires the generation of test input values corresponding to the input parameters for the functional component. The test input values are then provided as input during execution of the functional component, and the output of the functional component is compared to an expected output of the functional component to determine whether the functional component performed as expected.

However, the process for developing unit tests for a functional component may prove inefficient and tedious when performed manually by a software developer. In particular, test input values and expected outputs that are manually generated for unit testing may not provide adequate test coverage for the functional component. If the test input values do not ensure that all of the programming instructions of the functional component are executed and validated during unit testing, the untested subset of the programming instructions may cause suboptimal performance of the functional component during later use.

Accordingly, examples disclosed herein relate to generating test input values for functional components based on test coverage analysis. In one example, a processor device of a computing device performs a test coverage analysis of a plurality of programming instructions of a functional component that takes a plurality of input parameters. As used herein, "test coverage analysis" refers to a process for analyzing a functional component to identify any portions of the programming instructions thereof for which sufficient unit testing and validation has not been performed. Based on the test coverage analysis, the processor device identifies a subset of the programming instructions for which testing has not been performed (i.e., no test coverage exists for that subset of the programming instructions). The processor device then identifies a data type for each of the functional component's input parameters and generates test input values based on the data types and the test coverage analysis. In particular, the test input values that are generated include a test input value that causes executable instructions corresponding to the subset of programming instructions to be executed during subsequent testing. The test input values may be used during subsequent unit testing to ensure full test coverage of the programming instructions of the functional component.

In some examples, the processor device may first verify that the functional component is a "pure" function (i.e., the functional component depends only on its own input parameters, does not change variables out of its scope, and does not produce side effects). By doing so, the processor device can ensure that the generation of the test input values can be performed automatically, without requiring manual user input. Some examples may provide that identifying the subset of the programming instructions for which testing has not been performed may be accomplished by building an Abstract Syntax Tree (AST) representation of the functional component and using the AST representation to identify the subset. In some examples, identifying the data types of the functional component's input parameters may be accomplished by building a tree data structure comprising a plurality of nodes, where each inner node corresponds to a composite data type and each leaf node corresponds to a primitive data type. The tree data structure may then be traversed to generate test input values for each identified primitive data type corresponding to the leaf nodes.

Figure 1:
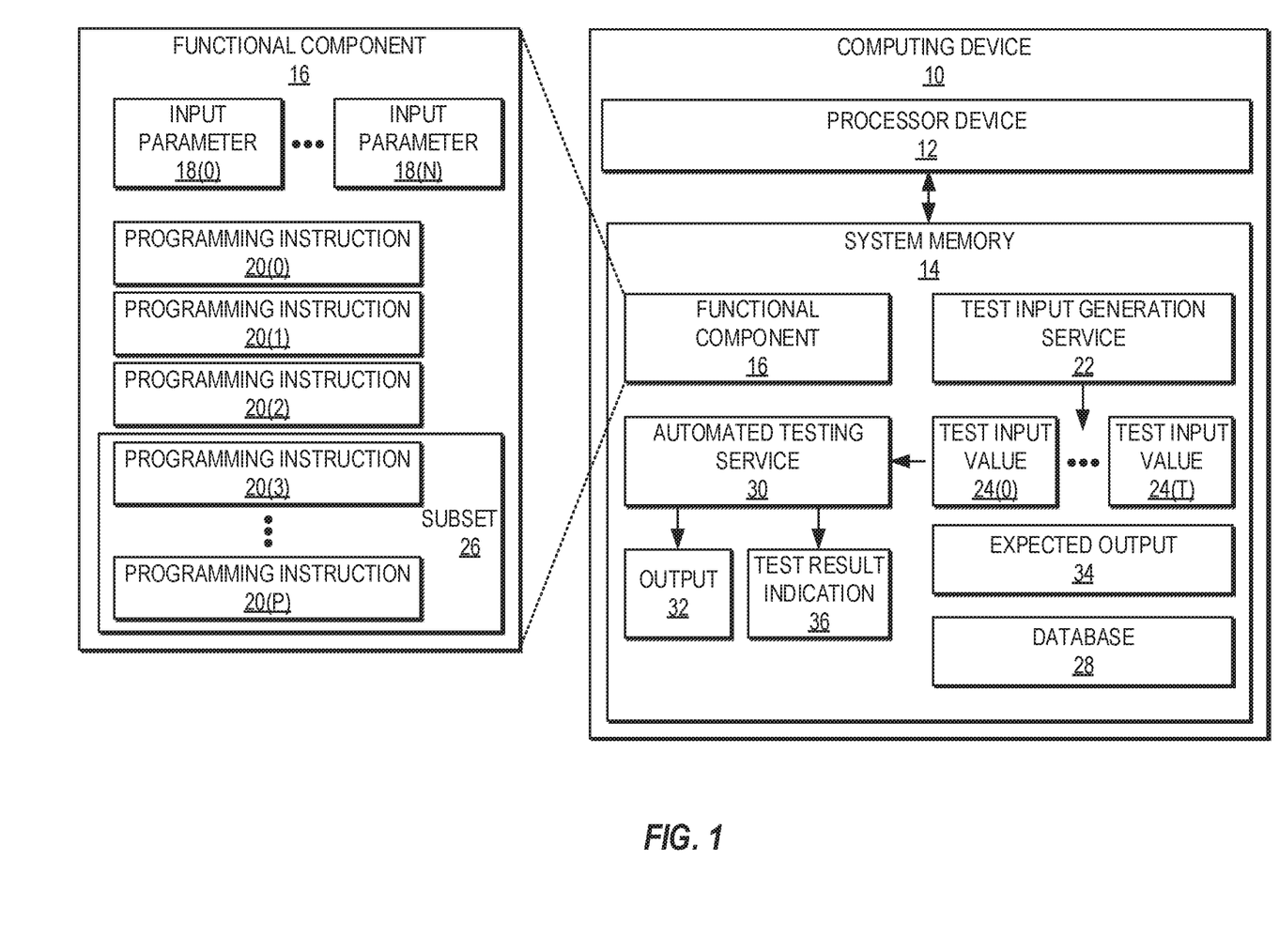
FIG. 1 is a block diagram of a computing device in which examples may be practiced.

To illustrate a computing device on which examples may be practiced, FIG. 1 is provided. In FIG. 1, a computing device 10 includes a processor device 12 communicatively coupled to a system memory 14. The computing device 10 of FIG. 1 also includes a functional component 16 that is stored in the system memory 14 and that may be executed by the processor device 12 to provide a specified functionality. In the example of FIG. 1, the functional component 16 takes a plurality of input parameters 18(0)-18(N), each of which may comprise a primitive data type (i.e., a basic data type, such as an integer or a floating-point number, that is predefined by a programming language used to implement the functional component 16) or a composite data type (i.e., a data type derived from one or more primitive data types). The functionality provided by the functional component 16 is implemented using a plurality of programming instructions 20(0)-20(P). The plurality of programming instructions 20(0)-20(P) may comprise source code instructions that are later compiled into machine-executable instructions, intermediate instructions (i.e., between source code instructions and machine-executable instructions) such as bytecode or portable code, or interpreted instructions. The functional component 16 may be implemented from scratch by a software developer using a programming language such as Java, Javascript, PHP, or the like, and/or may be implemented using a programming framework such as React.

The computing device 10 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some embodiments of the computing device 10 may include more or fewer elements than illustrated in FIG. 1. For example, the processor device 12 may further include one or more functional units, instruction caches, unified caches, memory controllers, interconnect buses, and/or additional memory devices, caches, and/or controller circuits, which are omitted from FIG. 1 for the sake of clarity.

To automate the process of unit testing for the functional component 16, the processor device 12 in some examples may execute a test input generation service 22 to generate test input values 24(0)-24(T) for the functional component 16, based on test coverage analysis of the functional component 16. Accordingly, the test input generation service 22 may first perform a test coverage analysis of the plurality of programming instructions 20(0)-20(P), and, based on the test coverage analysis, identify a subset 26 of the plurality of programming instructions 20(0)-20(P) for which testing has not been performed.

As noted above, the test coverage analysis may include any process or procedure for analyzing the functional component 16 to identify any portions of the programming instructions 20(0)-20(P) (i.e., the subset 26) for which sufficient unit testing and validation has not been performed. For example, the subset 26 may include branches of an if-then conditional statement, a switch conditional statement, or other program code that previous unit testing failed to validate because, e.g., the test input values used caused other branches or code to be executed. In some examples, the test coverage analysis may be performed using known techniques based on test coverage data provided by, e.g., a code repository (not shown) in which the functional component 16 is stored, or on testing software (not shown) previously used to perform unit testing on the functional component 16.

Some examples may provide that the test input generation service 22 may perform the test coverage analysis by generating an AST representation (not shown) of the programming instructions 20(0)-20(P) of the functional component 16. The test input generation service 22 may then use the AST representation (e.g., along with test input values used during previous unit testing) to determine that the subset 26 of the plurality of programming instructions 20(0)-20(P) would not have been executed during the previous unit testing. An exemplary AST representation is discussed in greater detail below with respect to FIG. 2.

The test input generation service 22 next identifies a data type of each input parameter of the plurality of input parameters 18(0)-18(N) of the functional component 16. In some examples, the test input generation service 22 may identify the data types of the input parameters 18(0)-18(N) by building a tree data structure (not shown) that includes a plurality of nodes that correspond to the input parameters 18(0)-18(N). The tree data structure may be constructed such that each inner node (if any) corresponds to a composite data type, while each leaf node corresponds to a primitive data type. Thus, for example, if one of the input parameters 18(0)-18(N) is a data structure comprising a string parameter and an integer parameter, the input parameter would be represented by an inner node in the tree data structure, while the string parameter and the integer parameter would be represented by leaf nodes that are children of the inner node. An exemplary tree data structure is discussed in greater detail below with respect to FIG. 3.

Finally, the test input generation service 22 generates the plurality of test input values 24(0)-24(T) based on the identified data types of the input parameters 18(0)-18(N). The test input values 24(0)-24(T) include at least one test input value that causes executable instructions corresponding to the subset 26 of the programming instructions 20(0)-20(P) of the functional component 16 to be executed during subsequent testing. In examples in which an AST representation of the programming instructions 20(0)-20(P) is used to perform test coverage analysis, the test input generation service 22 may use the AST representation to determine a test input value that will cause the executable instructions corresponding to the subset 26 of the programming instructions 20(0)-20(P) of the functional component 16 to be executed. For instance, the test input generation service 22 may use the AST representation to identify a branch of an if-then conditional statement that lacks test coverage and to generate a test input value that will ensure that the branch is executed during subsequent testing. In examples in which a tree data structure is used to identify data types of the input parameters 18(0)-18(N), the test input generation service 22 may walk the tree to identify each leaf node and may generate test input values based on the primitive data values corresponding to each leaf node.

In some examples, the test input values 24(0)-24(T) may comprise a boundary case for each input parameter of the plurality of input parameters 18(0)-18(N). For example, for input parameters 18(0)-18(N) having an integer data type, corresponding test input values 24(0)-24(T) may include non-integer values, out-of-range values, and/or other known error-prone values to test whether the functional component 16 will handle such values appropriately. Some examples may provide that the test input values 24(0)-24(T) may comprise user-supplied test input values (e.g., that are supplied for each primitive data type).

Some examples may provide that, before beginning the process for generating the test input values 24(0)-24(T), the test input generation service 22 may first determine that the functional component 16 comprises a "pure" function (i.e., the functional component 16 depends only on its own input parameters, does not change variables out of its scope, and does not produce side effects). This operation may be performed in recognition of the fact that generating test input values for non-pure functions may require manual user input or intervention in order to produce predictable results, and thus may not be able to be performed automatically by the test input generation service 22.

In some such examples, the test input generation service 22 may determine that the functional component 16 is a pure function based on source code notation (e.g., by developer comments within the source code of the functional component 16). Some examples may provide that the test input generation service 22 determines that the functional component 16 is a pure function by comparing the functional component 16 to a database 28 of known pure functions. According to some examples, the test input generation service 22 may use a machine learning (ML) algorithm to determine whether the functional component 16 is a pure function. For instance, the ML algorithm may employ a model that is trained using known pure functions, and that may then be applied to the functional component 16.

According to some examples, the processor device 12 may also execute an automated testing service 30 to perform unit testing of the functional component 16, using the test input values 24(0)-24(T) for the input parameters 18(0)-18(N), to generate an output 32. The automated testing service 30 may then compare the output 32 to an expected output 34 for the functional component 16. For instance, in examples in which the functional component 16 uses the React framework to generate a user interface element, the expected output 34 may comprise a rendering of a desired user interface element, and the output 32 may comprise a rendering that is actually generated by the functional component 16 using the test input values 24(0)-24(T). Based on the comparison of the output 32 with the expected output 34, the automated testing service 30 may generate a test result indication 36 to indicate whether the functional component 16 operated as expected.

Figure 2:
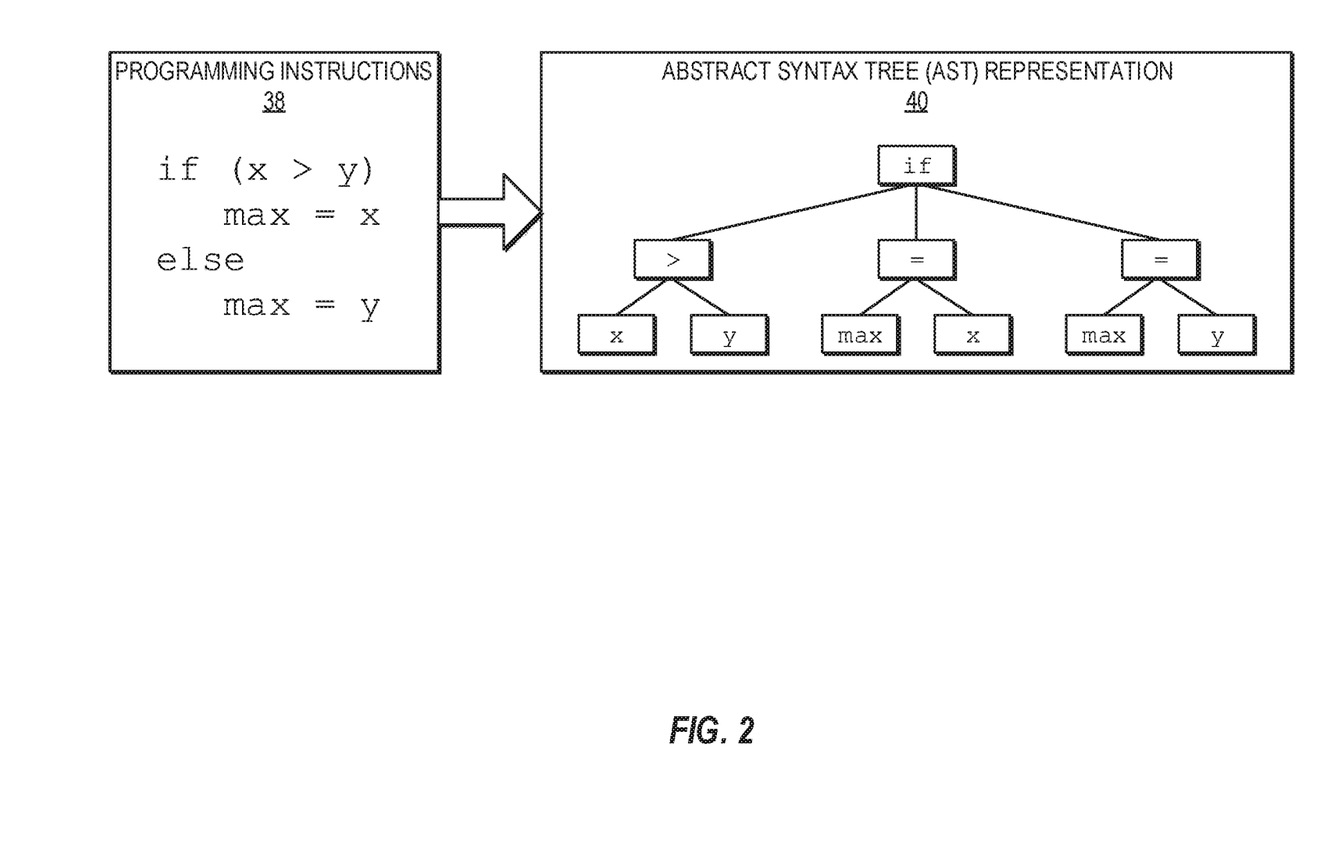
FIG. 2 is a block diagram illustrating an exemplary Abstract Syntax Tree (AST) representation that may be employed when performing a test coverage analysis of the functional component of FIG. 1 and generating the test input values of FIG. 1, according to one example.

To illustrate a simplified AST representation that may be employed when performing a test coverage analysis of the functional component 16 of FIG. 1, FIG. 2 is provided. As seen in FIG. 2, programming instructions 38 include an if-then conditional statement that determines whether a value of a variable "x" is greater than a value of a variable "y." If so, a variable "max" is set to the value of "x," otherwise "max" is set to the value of "y." The programming instructions 38 may be used to generate an AST representation 40, which in the example of FIG. 2 is a tree structure in which each node corresponds to a construct within the programming instructions 38. Thus, each statement, operation, and variable within the programming instructions 38 is represented by a corresponding node in the AST representation 40. As noted above, AST representations such as the AST representation 40 may be used to identify portions of code that lack test coverage and to generate test input values that may ensure that such portions of code are executed during unit testing (e.g., by identifying test input values that will cause all branches of a conditional statement to be executed during unit testing).

Figure 3:
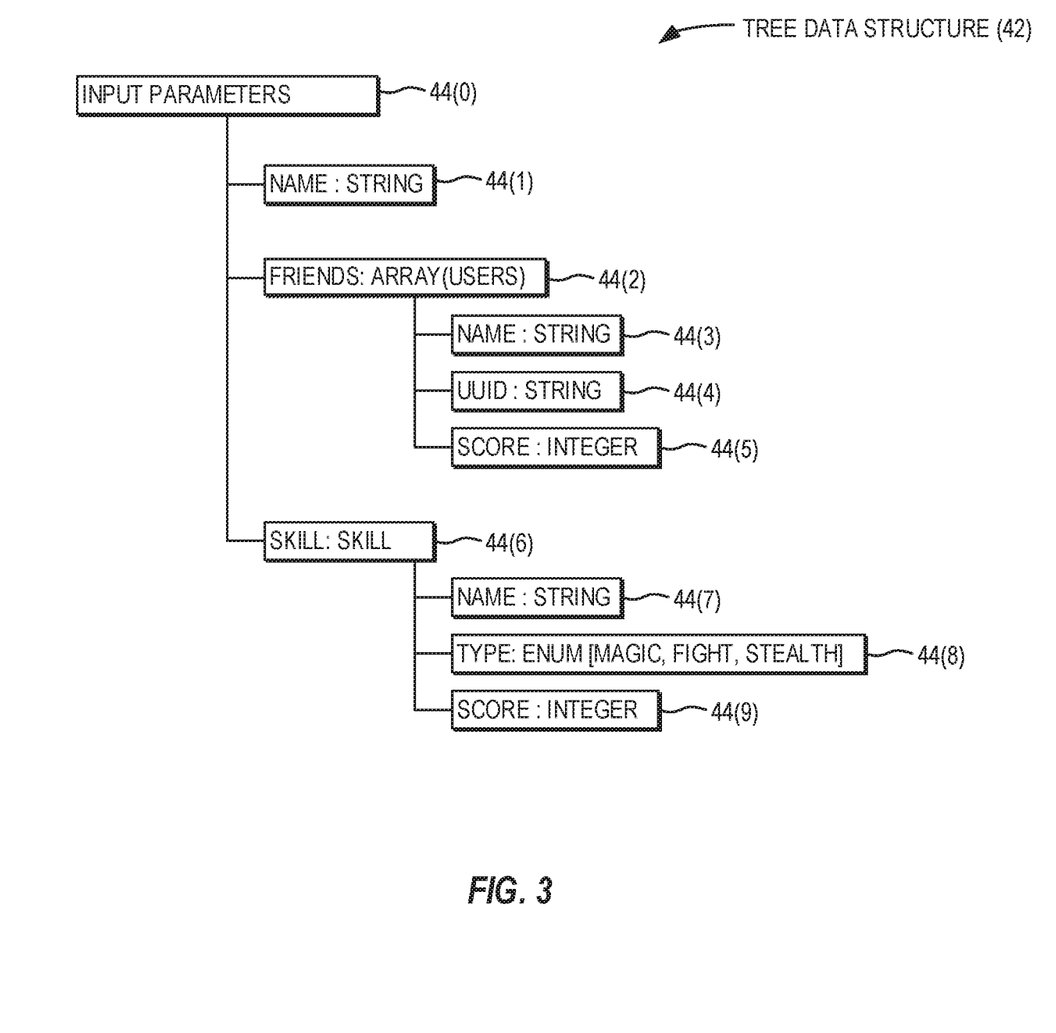
FIG. 3 is a block diagram of a tree data structure that may be employed when identifying data types of the input parameters of FIG. 1, and generating the test input values of FIG. 1, according to one example.

FIG. 3 illustrates an exemplary tree data structure 42 that may be generated and used in identifying data types of the input parameters 18(0)-18(N) of the functional component 16 of FIG. 1 and generating the test input values 24(0)-24(T) of FIG. 1, according to one example. The tree data structure 42 of FIG. 3 includes a plurality of nodes 44(0)-44(9). The node 44(0) serves as the root node of the tree data structure 42, while the nodes 44(1), 44(2), and 44(6) correspond to input parameters designated as "NAME," "FRIENDS," and "SKILL," respectively. In the tree data structure 42, inner nodes such as nodes 44(2) and 44(6) correspond to composite data types (i.e., data types derived from primitive data types), while leaf nodes such as nodes 44(1), 44(3)-44(5), and 44(7)-44(9) correspond to primitive data types.

Some examples of the test input generation service 22 of FIG. 1 may generate a tree data structure such as the tree data structure 42 based on, e.g., a definition of the input parameters 18(0)-18(N) specified by the functional component 16. The test input generation service 22 subsequently may generate the plurality of test input values 24(0)-24(T) by traversing the tree data structure 42 and generating an input test value of the plurality of test input values 24(0)-24(T) for each leaf node 44(1), 44(3)-44(5), and 44(7)-44(9) within the tree data structure 42.

Figure 4A:
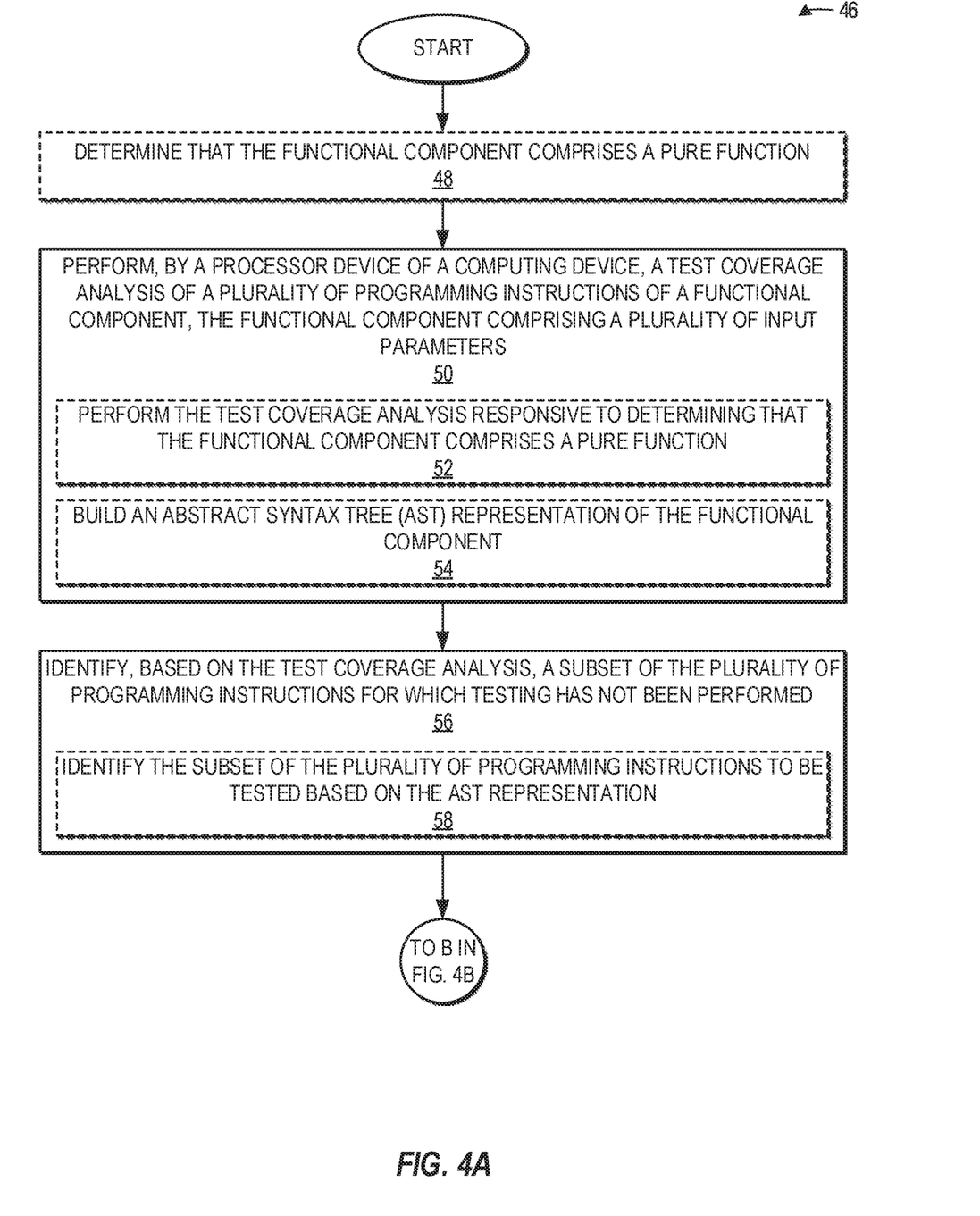
FIGS. 4A-4C are flowcharts illustrating exemplary operations for generating test input values for functional components based on test coverage analysis, according to one example.
Figure 4B:
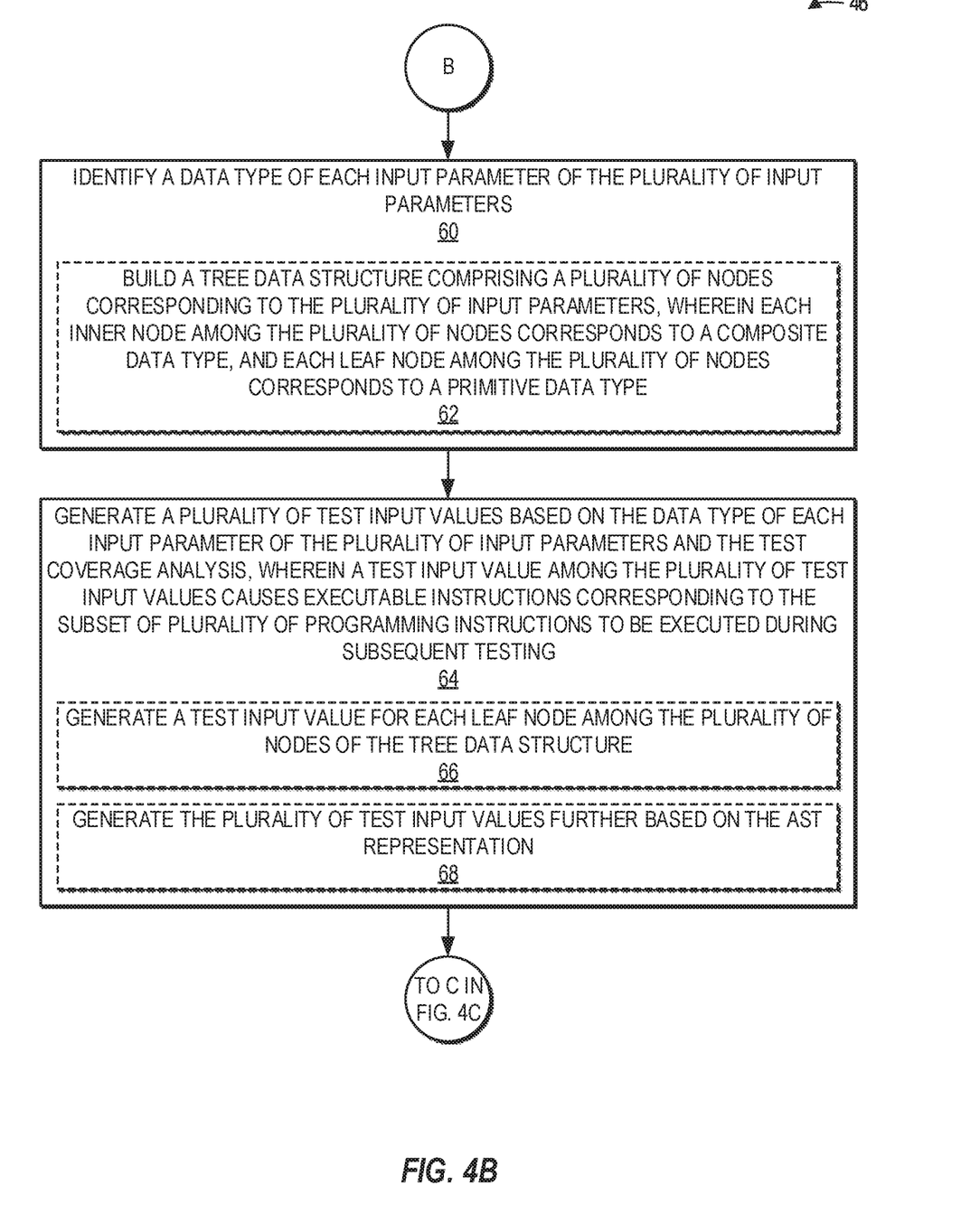
Figure 4C:
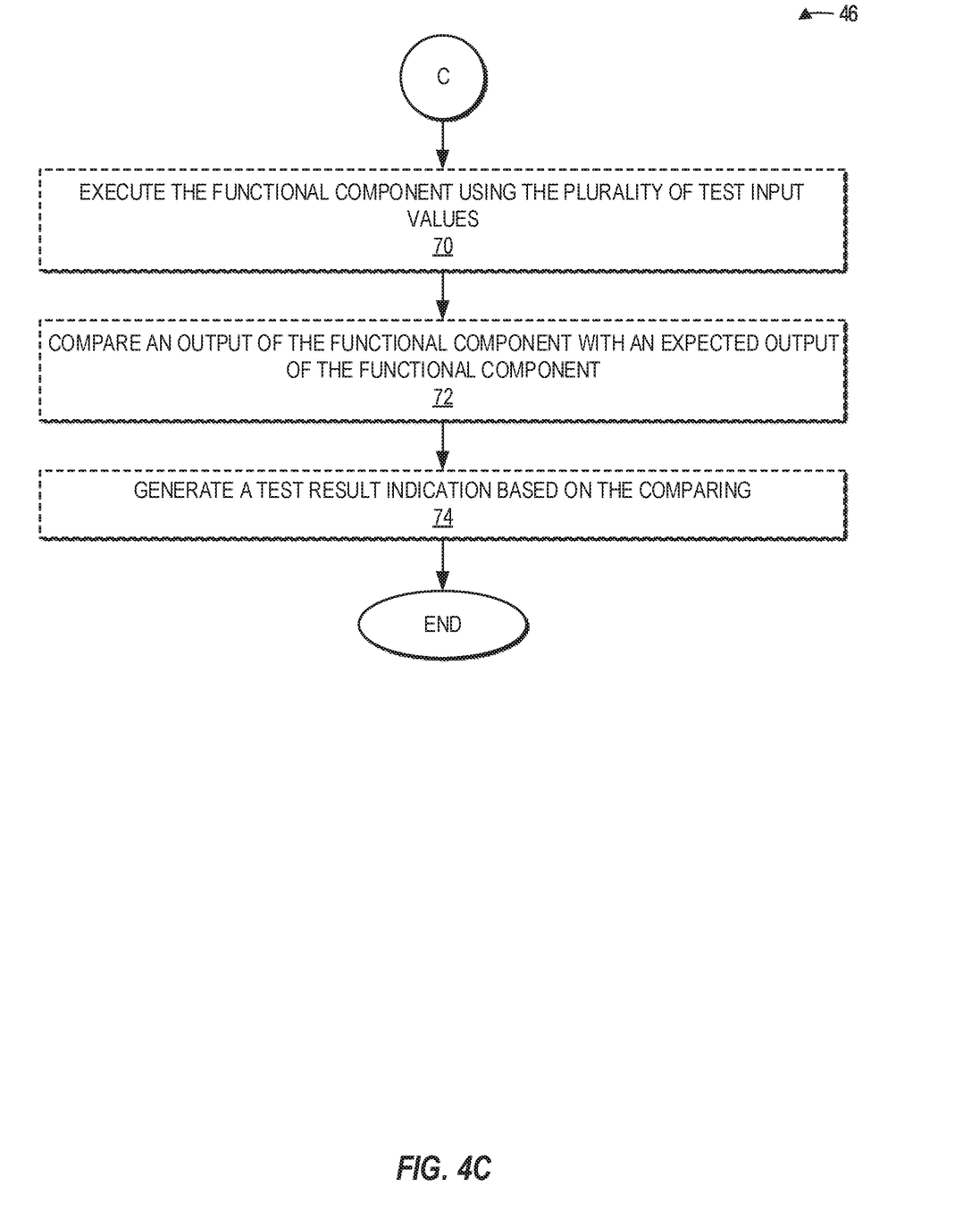

To illustrate exemplary operations for generating test input values for functional components based on test coverage analysis according to one example, FIGS. 4A-4C provide a flowchart 46. For the sake of clarity, elements of FIGS. 1-3 are referenced in describing FIGS. 4A-4C. Operations in FIG. 4A according to some examples begin with the processor device 12 of the computing device 10 (e.g., executing the test input generation service 22, as a non-limiting example), determining that the functional component 16 comprises a pure function (block 48). The processor device 12 then performs a test coverage analysis of the plurality of programming instructions 20(0)-20(P) of the functional component 16, the functional component 16 comprising the plurality of input parameters 18(0)-18(N) (block 50). In some examples, operations of block 50 for performing the test coverage analysis comprise performing the test coverage analysis responsive to determining that the functional component 16 comprises a pure function (block 52). Some examples provide that the operations of block 50 for performing the test coverage analysis comprise building an AST representation (such as the AST representation 40 of FIG. 2) of the functional component 16 (block 54).

The processor device 12 next identifies, based on the test coverage analysis, the subset 26 of the plurality of programming instructions 20(0)-20(P) for which testing has not been performed (block 56). According to some examples, the operations of block 56 for identifying the subset 26 of the plurality of programming instructions 20(0)-20(P) for which testing has not been performed may include identifying the subset 26 of the plurality of programming instructions 20(0)-20(P) to be tested based on the AST representation 40 (block 58). Operations then continue at block 60 of FIG. 4B.

Referring now to FIG. 4B, the processor device 12 next identifies the data type of each input parameter of the plurality of input parameters 18(0)-18(N) (block 60). In some examples, operations of block 60 for identifying the data type of each input parameter of the plurality of input parameters 18(0)-18(N) may include building a tree data structure (such as the tree data structure 42 of FIG. 3) comprising a plurality of nodes (such as the plurality of nodes 44(0)-44(9) of FIG. 3) corresponding to the plurality of input parameters 18(0)-18(N), wherein each inner node among the plurality of nodes 44(0)-44(9) corresponds to a composite data type, and each leaf node among the plurality of nodes 44(0)-44(9) corresponds to a primitive data type (block 62).

The processor device 12 then generates the plurality of test input values 24(0)-24(T) based on the data type of each input parameter of the plurality of input parameters 18(0)-18(N) and the test coverage analysis, wherein a test input value among the plurality of test input values 24(0)-24(T) causes executable instructions corresponding to the subset 26 of plurality of programming instructions 20(0)-20(P) to be executed during subsequent testing (block 64). Some examples may provide that the operations of block 64 for generating the plurality of test input values 24(0)-24(T) include generating a test input value 24(0)-24(T) for each leaf node among the plurality of nodes 44(0)-44(9) of the tree data structure 42 (block 66). In some examples, the operations of block 64 for generating the plurality of test input values 24(0)-24(T) may include generating the plurality of test input values 24(0)-24(T) further based on the AST representation 40 (block 68). Operations according to some examples then continue at block 70 of FIG. 4C.

Turning now to FIG. 4C, the processor device 12 in some examples (e.g., by executing the automated testing service 30) may execute the functional component 16 using the plurality of test input values 24(0)-24(T) (block 70). The processor device 12 next compares an output 32 of the functional component 16 with an expected output 34 of the functional component 16 (block 72). The processor device 12 then generates the test result indication 36 based on the comparing (block 74).

Figure 5:
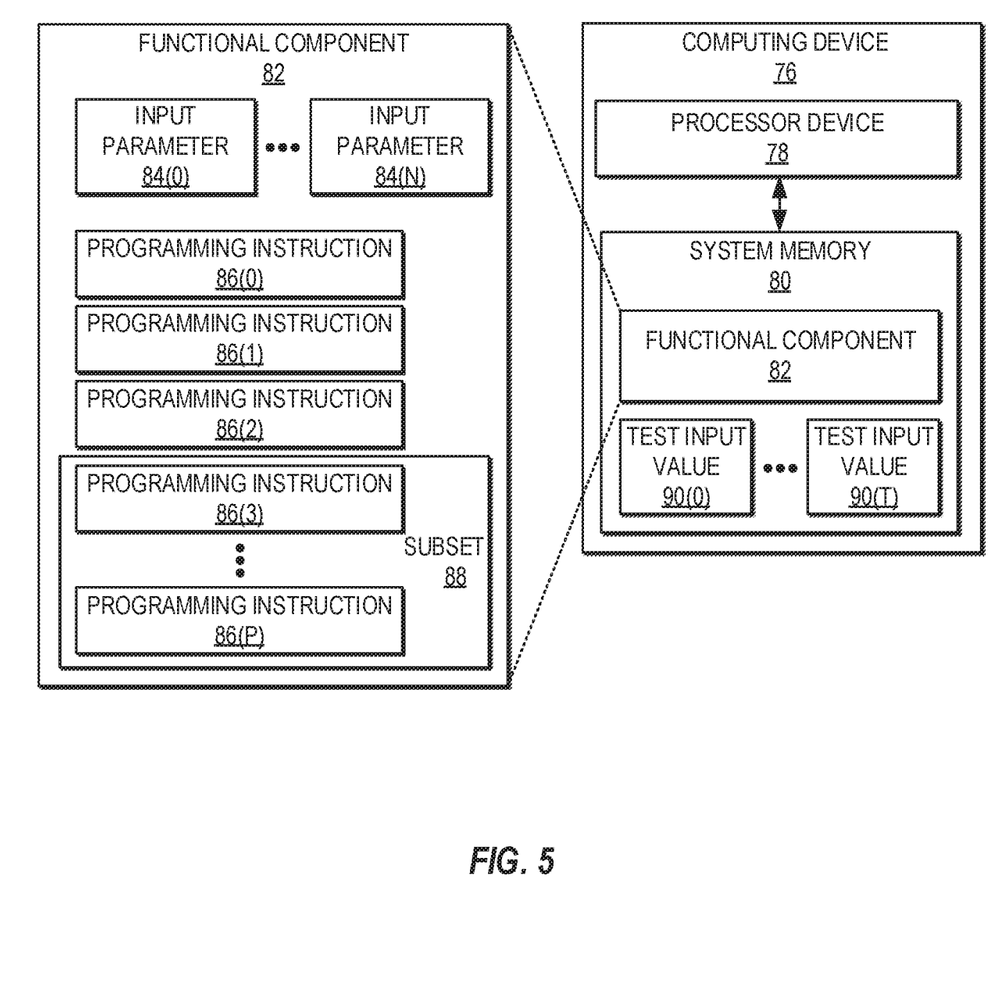
FIG. 5 is a simpler block diagram of the computing device of FIG. 1 for generating test input values based on test coverage analysis, according to one example.

FIG. 5 is a simpler block diagram of the computing device 10 of FIG. 1 for generating test input values based on test coverage analysis, according to one example. In FIG. 5, a computing device 76 includes a processor device 78 communicatively coupled to a system memory 80. The computing device 76 of FIG. 5 also includes a functional component 82 that is stored in the system memory 80 and that may be executed by the processor device 78 to provide a specified functionality. In the example of FIG. 5, the functional component 82 takes a plurality of input parameters 84(0)-84(N). The functionality provided by the functional component 82 is implemented using a plurality of programming instructions 86(0)-86(P), which may comprise source code instructions that are later compiled into machine-executable instructions, intermediate instructions (i.e., between source code instruction and machine-executable instructions), such as bytecode or portable code, or interpreted instructions.

The processor device 78 performs a test coverage analysis of the plurality of programming instructions 86(0)-86(P), and, based on the test coverage analysis, identifies a subset 88 of the plurality of programming instructions 86(0)-86(P) for which testing has not been performed. The processor device 78 next identifies a data type of each input parameter of the plurality of input parameters 84(0)-84(N) of the functional component 82. Finally, the processor device 78 generates a plurality of test input values 90(0)-90(T) based on the identified data types of the input parameters 84(0)-84(N). The test input values 90(0)-90(T) include at least one test input value that causes executable instructions corresponding to the subset 88 of the programming instructions 86(0)-86(P) of the functional component 82 to be executed during subsequent testing.

Figure 6:
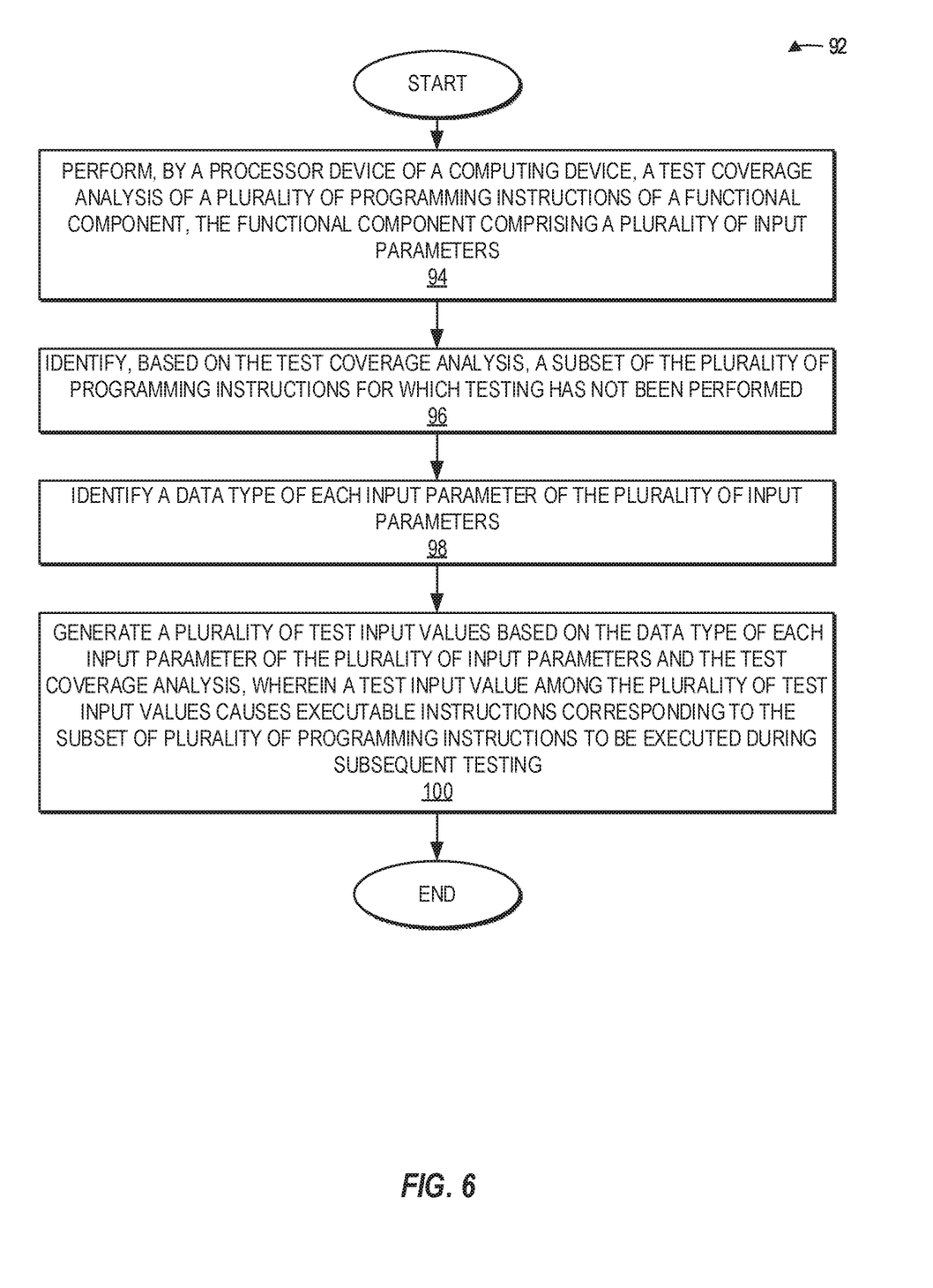
FIG. 6 is a flowchart of a simplified method for generating test input values based on test coverage analysis on the computing device of FIG. 5, according to one example.

To illustrate a simplified method for generating test input values based on test coverage analysis on the computing device 76 of FIG. 5 according to one example, FIG. 6 provides a flowchart 92. Elements of FIG. 5 are referenced in describing FIG. 6 for the sake of clarity. In FIG. 6, operations begin with the processor device 78 of the computing device 76 performing a test coverage analysis of the plurality of programming instructions 86(0)-86(P) of a functional component 82, the functional component 82 comprising a plurality of input parameters 84(0)-84(N) (block 94). The processor device 78 identifies, based on the test coverage analysis, a subset 88 of the plurality of programming instructions 86(0)-86(P) for which testing has not been performed (block 96).

The processor device 78 then identifies a data type of each input parameter of the plurality of input parameters 84(0)-84(N) (block 98). The processor device 78 then generates a plurality of test input values 90(0)-90(T) based on the data type of each input parameter of the plurality of input parameters 84(0)-84(N) and the test coverage analysis, wherein a test input value among the plurality of test input values 90(0)-90(T) causes executable instructions corresponding to the subset 88 of plurality of programming instructions 86(0)-86(P) to be executed during subsequent testing (block 100).

Figure 7:
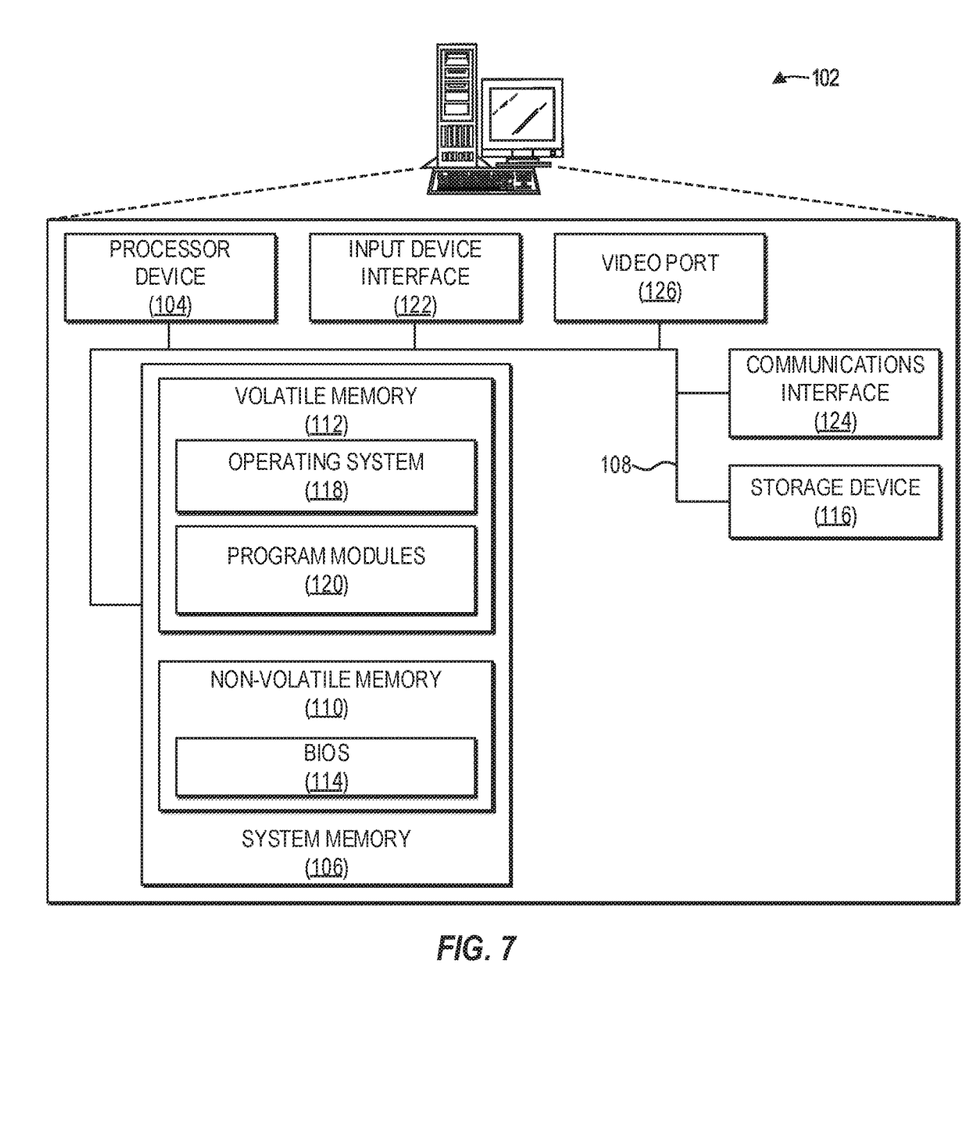
FIG. 7 is a block diagram of a computing device suitable for implementing examples, according to one example.

FIG. 7 is a block diagram of a computing device 102, such as the computing device 10 of FIG. 1 or the computing device 76 of FIG. 5, suitable for implementing examples according to one example. The computing device 102 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 102 includes a processor device 104, a system memory 106, and a system bus 108. The system bus 108 provides an interface for system components including, but not limited to, the system memory 106 and the processor device 104. The processor device 104 can be any commercially available or proprietary processor.

The system bus 108 may be any of several types of bus structures that may further interconnect to a memory bus (with or without a memory controller), a peripheral bus, and/or a local bus using any of a variety of commercially available bus architectures. The system memory 106 may include non-volatile memory 110 (e.g., read-only memory (ROM), erasable programmable ROM (EPROM), electrically EPROM (EEPROM), etc.), and volatile memory 112 (e.g., random access memory (RAM)). A basic input/output system (BIOS) 114 may be stored in the non-volatile memory 110 and can include the basic routines that help to transfer information among elements within the computing device 102. The volatile memory 112 may also include a high-speed RAM, such as static RAM, for caching data.

The computing device 102 may further include or be coupled to a non-transitory computer-readable storage medium such as a storage device 116, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 116 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 116 and in the volatile memory 112, including an operating system 118 and one or more program modules 120 which may implement the functionality described herein in whole or in part. It is to be appreciated that the examples can be implemented with various commercially available operating systems 118 or combinations of operating systems 118. All or a portion of the examples may be implemented as a computer program product stored on a transitory or non-transitory computer-usable or computer-readable storage medium, such as the storage device 116, which includes complex programming instructions, such as complex computer-readable program code, to cause the processor device 104 to carry out the steps described herein. Thus, the computer-readable program code can comprise software instructions for implementing the functionality of the examples described herein when executed on the processor device 104. The processor device 104 may serve as a controller, or control system, for the computing device 102 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 104 through an input device interface 122 that is coupled to the system bus 108 but can be connected by other interfaces, such as a parallel port, an Institute of Electrical and Electronic Engineers (IEEE) 13104 serial port, a Universal Serial Bus (USB) port, an infrared (IR) interface, and the like.

The computing device 102 may also include a communications interface 124 suitable for communicating with a network as appropriate or desired. The computing device 102 may also include a video port 126 to interface with a display device to provide information to a user. Individuals will recognize improvements and modifications to the preferred examples of the disclosure. All such improvements and modifications are considered within the scope of the concepts disclosed herein and the claims that follow.

What is claimed is:

1. A method, comprising:
performing, by a processor device of a computing device, a test coverage analysis of a plurality of programming instructions of a functional component, the functional component comprising a plurality of input parameters;
identifying, based on the test coverage analysis, a subset of the plurality of programming instructions for which testing has not been performed;
identifying a data type of each input parameter of the plurality of input parameters;
generating a plurality of test input values based on the data type of each input parameter of the plurality of input parameters and the test coverage analysis, wherein a test input value among the plurality of test input values causes executable instructions corresponding to the subset of the plurality of programming instructions to be executed during subsequent testing;
executing the functional component using the plurality of test input values;
comparing an output of the functional component with an expected output of the functional component; and
generating a test result indication based on the comparing.

2. The method of claim 1, wherein the functional component comprises a Javascript function.

3. The method of claim 1, further comprising determining that the functional component comprises a pure function; wherein performing the test coverage analysis is responsive to determining that the functional component comprises the pure function.

4. The method of claim 3, wherein determining that the functional component comprises a pure function is based on one of source code notation, a comparison of the functional component to a database of known pure functions, and a machine learning (ML) algorithm.

5. The method of claim 1, wherein:
performing the test coverage analysis comprises building an Abstract Syntax Tree (AST) representation of the functional component;
identifying the subset of the plurality of programming instructions to be tested is based on the AST representation; and
generating the plurality of test input values is further based on the AST representation.

6. The method of claim 1, wherein:
identifying the data type of each input parameter of the plurality of input parameters comprises:
building a tree data structure comprising a plurality of nodes corresponding to the plurality of input parameters, wherein:
each inner node among the plurality of nodes corresponds to a composite data type; and
each leaf node corresponds to a primitive data type; and
generating the plurality of test input values comprises generating a test input value for each leaf node among the plurality of nodes of the tree data structure.

7. The method of claim 1, wherein the plurality of test input values comprises one or more of a boundary case for each input parameter of the plurality of input parameters and a user-supplied test input value.

8. A computing device, comprising:
a system memory; and
a processor device coupled to the system memory to:
perform a test coverage analysis of a plurality of programming instructions of a functional component, the functional component comprising a plurality of input parameters;
identify, based on the test coverage analysis, a subset of the plurality of programming instructions for which testing has not been performed;
identify a data type of each input parameter of the plurality of input parameters;
generate a plurality of test input values based on the data type of each input parameter of the plurality of input parameters and the test coverage analysis, wherein a test input value among the plurality of test input values causes executable instructions corresponding to the subset of the plurality of programming instructions to be executed during subsequent testing;
execute the functional component using the plurality of test input values;
compare an output of the functional component with an expected output of the functional component; and
generate a test result indication based on the comparing.

9. The computing device of claim 8, wherein the functional component comprises a Javascript function.

10. The computing device of claim 8, wherein:
the processor device is further to determine that the functional component comprises a pure function; and
the processor device is to perform the test coverage analysis responsive to determining that the functional component comprises the pure function.

11. The computing device of claim 10, wherein the processor device is to determine that the functional component comprises a pure function based on one of source code notation, a comparison of the functional component to a database of known pure functions, and a machine learning (ML) algorithm.

12. The computing device of claim 8, wherein:
to perform the test coverage analysis is to build an Abstract Syntax Tree (AST) representation of the functional component;

the processor device is to identify the subset of the plurality of programming instructions to be tested based on the AST representation; and the processor device is to generate the plurality of test input values further based on the AST representation.

13. The computing device of claim 8, wherein:

to identify the data type of each input parameter of the plurality of input parameters is to build a tree data structure comprising a plurality of nodes corresponding to the plurality of input parameters, wherein:

each inner node among the plurality of nodes corresponds to a composite data type; and each leaf node corresponds to a primitive data type; and to generate the plurality of test input values is to generate a test input value for each leaf node among the plurality of nodes of the tree data structure.

14. The computing device of claim 8, wherein the plurality of test input values comprises one or more of a boundary case for each input parameter of the plurality of input parameters and a user-supplied test input value.

15. A method, comprising:

performing, by a processor device of a computing device, a test coverage analysis of a plurality of programming instructions of a functional component, the functional component comprising a plurality of input parameters, wherein performing the test coverage analysis comprises building an Abstract Syntax Tree (AST) representation of the functional component;

identifying, based on the AST representation, a subset of the plurality of programming instructions for which testing has not been performed;

identifying a data type of each input parameter of the plurality of input parameters; and generating a plurality of test input values based on the data type of each input parameter of the plurality of input parameters and the AST representation, wherein a test input value among the plurality of test input values causes executable instructions corresponding to the subset of the plurality of programming instructions to be executed during subsequent testing.

16. A computing device, comprising:

a system memory; and a processor device coupled to the system memory to:

perform a test coverage analysis of a plurality of programming instructions of a functional component, the functional component comprising a plurality of input parameters, wherein performing the test coverage analysis comprises building an Abstract Syntax Tree (AST) representation of the functional component;

identify, based on the AST representation, a subset of the plurality of programming instructions for which testing has not been performed;

identify a data type of each input parameter of the plurality of input parameters; and generate a plurality of test input values based on the data type of each input parameter of the plurality of input parameters and the AST representation, wherein a test input value among the plurality of test input values causes executable instructions corresponding to the subset of the plurality of programming instructions to be executed during subsequent testing.

* * * * *